United States Patent [19]

Wahl

[11] B 4,007,636

[45] Feb. 15, 1977

[54] LIQUID METAL LEVEL INDICATOR

[75] Inventor: Martin H. Wahl, Evans City, Pa.

[73] Assignee: Mine Safety Appliances Company, Pittsburgh, Pa.

[22] Filed: Mar. 4, 1975

[21] Appl. No.: 555,146

[44] Published under the second Trial Voluntary Protest Program on April 20, 1976 as document No. B 555,146.

Related U.S. Application Data

[63] Continuation of Ser. No. 392,965, Aug. 30, 1973, abandoned.

[52] U.S. Cl. .............................................. 73/290 R
[51] Int. Cl.² ......................................... G01F 23/26
[58] Field of Search .......... 73/290 R, 304 R, 304 C

[56] References Cited

UNITED STATES PATENTS

| 3,157,048 | 11/1964 | Williams | 73/304 R |
| 3,326,043 | 6/1967 | Roeske | 73/290 R |
| 3,343,415 | 9/1967 | Johnston | 73/304 C |
| 3,370,466 | 2/1968 | Chang | 73/304 R |
| 3,443,438 | 5/1969 | Martin et al. | 73/304 R |
| 3,777,257 | 12/1973 | Geisselmann | 73/304 C |
| 3,777,566 | 12/1973 | Marinaccio | 73/290 R |

*Primary Examiner*—S. Clement Swisher
*Attorney, Agent, or Firm*—Brown, Murray, Flick & Peckham

[57] ABSTRACT

A liquid metal level indicator is provided comprising a number of separate, substantially identical coils supported in a vertical array and adapted to be extended into a liquid metal bath. Means are provided for comparing the impedance of each coil to that of the next adjacent coil successively from one end of the array to the other to indicate the liquid level by the change in impedance of the coils due to the presence of liquid metal surrounding them.

2 Claims, 2 Drawing Figures

LIQUID METAL LEVEL INDICATOR

This is a continuation of application Ser. No. 392,965, filed Aug. 30, 1973, now abandoned.

BACKGROUND OF THE INVENTION

The present invention relates to liquid level detectors or indicators for liquid metals, or other conductive liquids, and particularly to such a detector which is inherently temperature compensated and which provides continuous liquid level indication without requiring calibration.

Various types of level detectors or gages for liquid metal are known. In the inductance type of level detector, a coil or coils are used which can be submerged in the liquid metal, as in a well or probe, for example. The presence of a conductive medium such as liquid metal immediately surrounding the coil changes the inductance of the coil, as compared to its inductance in air, and this change can be used to detect the liquid level by sensing the change in inductance, or the corresponding change in impedance. This may be done by actual measurement of the inductance or impedance but it is preferably done by comparing the impedance of a sensing coil with that of a reference coil which is substantially unaffected by the liquid metal.

In such a device, however, the inductances of both the sensing coil and the reference coil are affected by temperature, and possibly other environmental conditions, so that erroneous indications may be obtained unless some form of temperature compensation is provided. This may be done by comparing the sensing coil with a reference coil which is shielded so as not to be affected by the liquid metal and is subjected to the same environmental conditions as the sensing coil, so that temperature effects cancel out, as disclosed in a copending application of L. F. Marinaccio, Ser. No. 297,875, filed Oct. 16, 1972, now Pat. No. 3,777,566 and assigned to the Assignee of the present invention. Such an arrangement is satisfactory for sensing a liquid level but is not well adapted for providing a continuous indication over the entire depth of a metal bath, and accurate calibration is required if such indication is needed. It has been proposed to provide such continuous indication by comparing each one of a series of sensing coils individually with a remote reference coil, as in Roeske et al U.S. Pat. No. 3,326,043, but serious errors may occur in such an arrangement because of temperature differences between the sensing coils and the reference coil and temperature compensation is not easily obtainable in such an arrangement.

SUMMARY OF THE INVENTION

In accordance with the present invention, a liquid level indicator for liquid metal is provided which is inherently temperature compensated, and which provides a continuous indication of the liquid level throughout the depth of the metal bath but requires no calibration.

These results are obtained by means of a plurality of substantially identical coils which are disposed in closely spaced relation in a vertical array, preferably being mounted on a common magnetic core. This vertical array of coils is adapted to be inserted into a liquid metal bath, as in a probe or well, so as to be closely surrounded by the liquid metal. The coils are individually connected to a comparison and indicating circuit, and scanning or switching means are provided to connect the coils successively to the comparison circuit in such a manner that adjacent coils are compared successively from one end of the array to the other. That is, the impedance of each coil is compared to that of the next coil, which is then compared to the next following coil, and so on from one end of the array to the other. Each coil is thus used as a sensing coil and as a reference coil in turn, and since all coils are subjected to the same environmental conditions, temperature and other effects are inherently cancelled out and compensated. The vertical array is preferably made long enough for the full depth of the tank or other container in which the liquid metal bath is contained and accurate indication of the position of the liquid level is obtained by noting where the impedance change between successive coils occurs. A continuous indication over the entire depth of the metal bath is thus obtained but without requiring calibration.

BRIEF DESCRIPTION OF THE DRAWINGS

The invention will be more fully understood from the following detailed description, taken in connection with the accompanying drawing, in which.

DESCRIPTION OF THE PREFERRED EMBODIMENT

Figure 1:
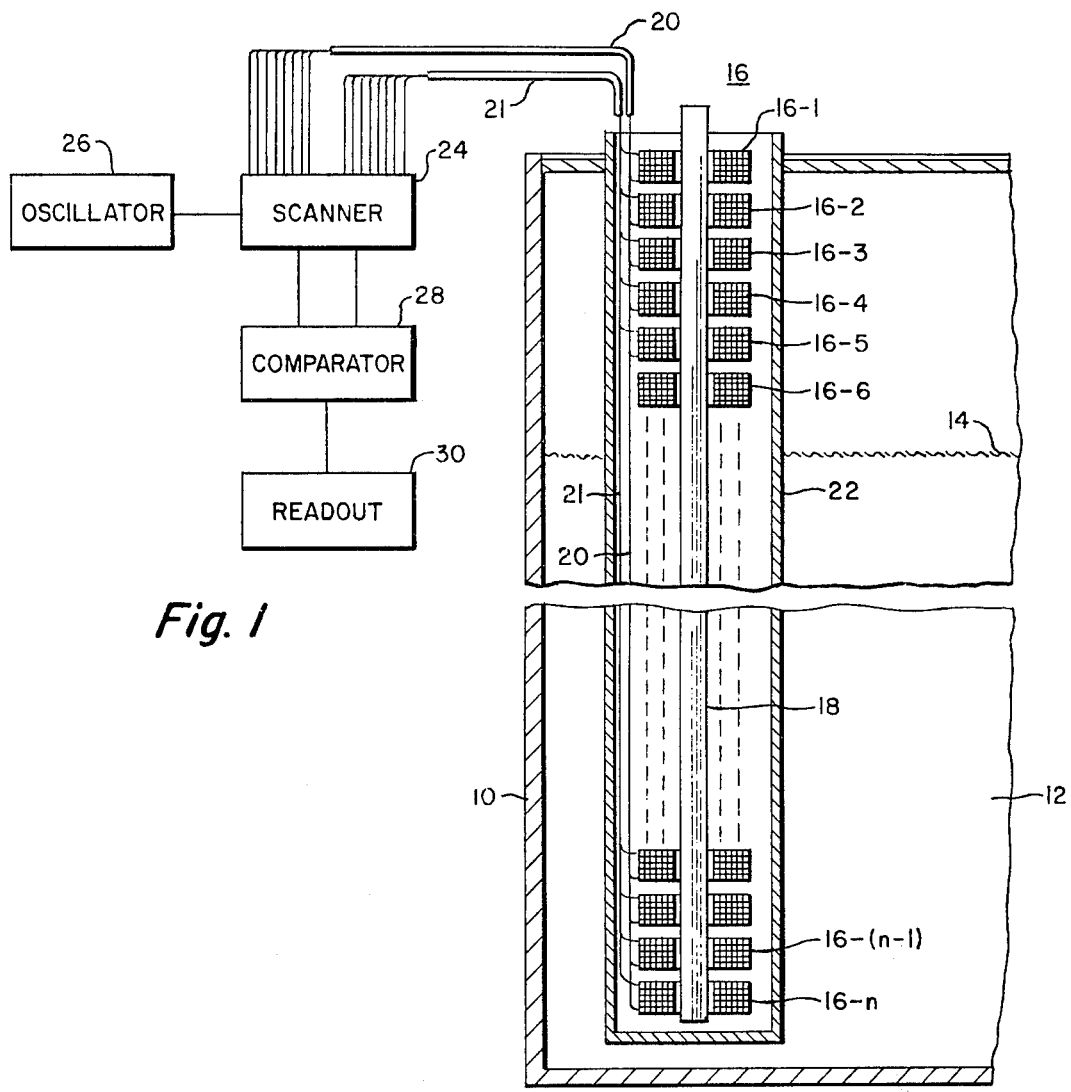
FIG. 1 is a somewhat diagrammatic illustration of a typical embodiment of the invention.

There is shown in FIG. 1 an illustrative embodiment of the invention for indicating the level or depth of a liquid metal bath contained in a tank or container 10 of any suitable type. The liquid metal bath 12 may consist of any desired molten metal, or any conductive liquid, and the tank 10 is filled to a level indicated at 14 which it is desired to detect. As previously indicated, the level detector of the present invention utilizes the change in inductance of an electrical coil which occurs when the coil is surrounded by a conductive medium, such as a liquid metal, as compared to its inductance in air. For this purpose, there is provided a series of coils 16, the individual coils being designated 16-1, 16-2, etc. The coils 16 are made as nearly identical as possible and are preferably multi-turn coils, properly insulated to withstand the relatively high temperatures to which they are subjected. The number and dimensions of the coils 16 are determined by the depth of the tank 10 and by the desired accuracy in locating the position of the level 14.

The coils 16 are discrete coils completely isolated from each other electrically, and they are physically disposed as illustrated in closely spaced coaxial relation in a vertical array. The coils may be supported in this manner by any suitable means but they are preferably mounted on a common magnetic core 18 which may take the form of a steel rod, or other suitable member, and which extends vertically for substantially the full depth of the tank 10. The magnetic core 18 is desirable because it serves to increase the inductance of the coils and makes the change in inductance when immersed in the liquid metal more pronounced but, if desired, the coils might be supported in any other suitable manner with or without a magnetic core. The coils 16 are electrically isolated on the core 18 and their leads are brought out separately. Thus, as illustrated, one lead from each of the coils may be brought together into a cable 20, and the other lead from each of the coils similarly brought together into a cable 21 for convenience in handling. The coils are not, however, directly connected together.

In order to utilize the array of coils, the entire assembly is arranged as shown to be inserted vertically into the liquid metal bath 12. This may conveniently be done by providing a tube 22 extending vertically downward from the top of the tank 10 to serve as a well or probe into which the array of coils 16 is inserted, either permanently or whenever it is desired to obtain a measurement or observation of the liquid level 14. The tube 22 is made of a suitable material such as a non-magnetic stainless steel which is compatible with the liquid metal 12, although any suitable material may be used. The tube 22 is designed so that the array of coils 16 fits relatively closely in the tube, so that the coils below the surface 14 are closely surrounded by the liquid metal to produce the maximum change in inductance between the coils in air and those below the liquid surface.

In order to detect the position of the liquid level 14, each of the coils 16 is compared to the next adjacent coil to determine any difference in inductance or impedance, and this is done successively from one end of the array to the other. That is, the impedance of coil 16-1 is compared to that of coil 16-2. Coil 16-2 is then compared to coil 16-3, and so on in successive pairs from one end of the array to the other. Since the coils are identical, any difference in impedance is due to external conditions, and the point at which the impedance of two successive coils becomes substantially different indicates the position of the liquid level 14. A positive and reliable indication is thus obtained and, since adjacent coils are subjected to the same environmental conditions, temperature effects are eliminated.

The comparisons may be made in any desired manner. As indicated schematically in FIG. 1, the leads of the individual coils are brought out in cables 20 and 21 and are separately connected to a scanner 24 which has an alternating current power supply such as an oscillator 26. The scanner 24 may be of any suitable type which connects the coils in successive pairs in the manner described above and provides signals to a comparator circuit 28 which effects the comparisons of the impedances of each pair of coils. The comparator 28 provides a signal to a readout device 30 of any suitable type which indicates the position of the liquid level 14 by any desired type of visual or audible signal, or which may be adapted to produce a permanent record.

Figure 2:
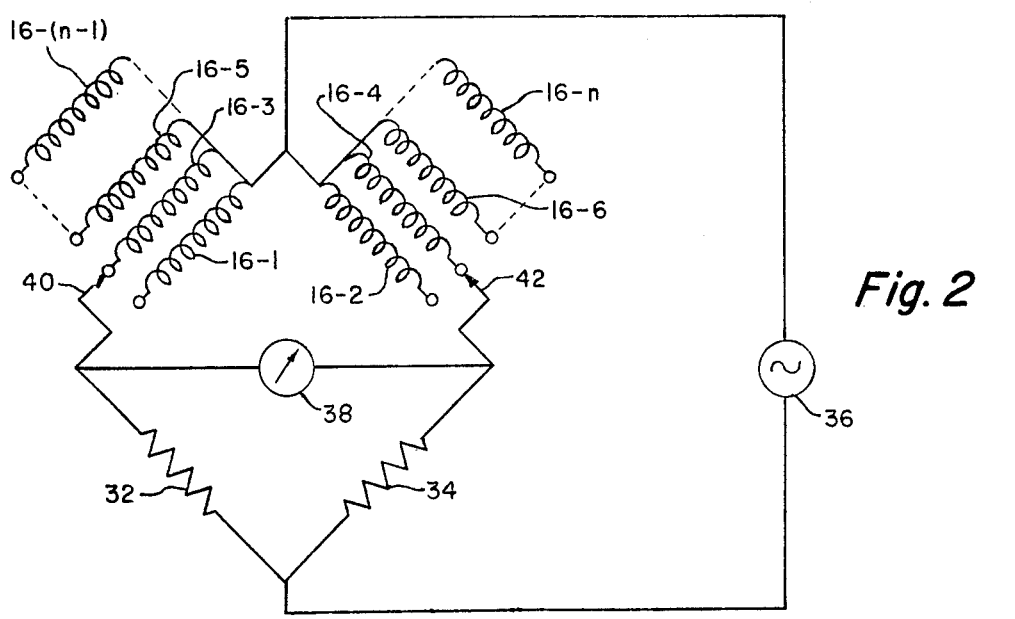
FIG. 2 is a schematic diagram of a scanning and comparison circuit.

One possible type of scanner and comparison circuit is shown in FIG. 5 to further illustrate the operation of the invention, although it will be understood that any suitable type of circuit may be utilized. The comparison circuit of FIG. 2 is shown as a bridge circuit having two reference arms 32 and 34 which may be identical in resistance and inductance, the other two arms of the bridge being formed by the coils to be compared. The bridge may be supplied by an oscillator or generator, indicated at 36, which provides a relatively high frequency supply of such frequency that the flux of the coils 16 penetrates sufficiently into the liquid metal so that the accuracy is not affected by the skin effect which may occur if the frequency is too high. An indicating or readout device 38 of any suitable type is connected across the diagonal of the bridge to indicate unbalance of the bridge.

The coils 16 to be compared are individually connected to form the other two arms of the bridge. Thus, in the arrangement shown, alternate coils are connected in one arm of the bridge by means of a selector switch 40 and the remaining coils are connected in the other arm of the bridge by a selector switch 42. It will be seen that by alternately moving the switches 40 and 42 from one coil to the next, successive pairs of coils may be compared in the bridge circuit. Thus, if the switches 40 and 42 are each placed on their respective first points, the coils 16-1 and 16-2 are connected in the bridge circuit for comparison. If the switch 40 is then moved to the next point, the coils 16-2 and 16-3 are connected in the bridge. Movement of the switch 42 to its next point results in comparison of coils 16-3 and 16-4 as illustrated in FIG. 2. It will be evident that by thus alternately moving the two switches from each point to the next, the coils are compared in successive pairs so that the point at which a marked change in impedance occurs is readily determined. Any other suitable switching arrangement could, of course, be used, such as a two-pole switch arranged to connect the coils in the bridge in successive pairs as described, or any other desired type of switching and comparison circuit or device might be utilized.

In the circuit of FIG. 2, the indicating device 38 may be set to zero reading when the bridge is balanced, and the resistors 32 and 34 may be selected so that this occurs when the coils 16 connected in the bridge are in air. The reading of the instrument 38 then will remain substantially unchanged until the coil at or immediately below the surface 14 of the liquid metal is connected in the bridge. This coil will have a markedly different impedance from the previous coil and the bridge will then become unbalanced, giving an indication on the instrument 38.

It will now be apparent that a very accurate and reliable indication of the position of a liquid level is obtained by means of the device described above. Since each coil 16 is used in turn as a sensing coil and as a reference coil, and since all coils are subjected to essentially identical environmental conditions, temperature effects are completely eliminated as all coils are subject to the same temperature changes. Similarly, other error-inducing effects such as those due to differing lead lengths are eliminated and inherent compensation for environmental conditions is obtained. It will also be seen that no calibration is necessary since the position of the coil at which the change in impedance occurs indicates the position of the liquid level, and the array of coils can be made of the necessary length to give a continuous indication in this way over the entire depth of the tank 10 or any desired part of the depth. Thus, a liquid metal level indicator is provided which is inherently compensated for temperature and other environmental variations, and which provides a continuous liquid level indication but requires no calibration.

It will be understood that although a particular embodiment of the invention has been shown and described, it is not limited to this particular arrangement and that other embodiments are possible. It will also be understood that although the invention has been described with reference to detecting liquid metal levels, the invention is also usable to detect the level of other conductive liquids in the same manner.

I claim as my invention:

1. A liquid metal level indicator comprising a plurality of substantially identical unshielded coils, means for supporting said coils in a vertical coaxial array extending over substantially the full depth of liquid metal to be measured, means for comparing the impedance of each coil to the impedance of the next adjacent coil successively from one end of the array to the other, and a common magnetic core on which said coils are supported.

2. A liquid metal level indicator as defined in claim 1 in which said core is a vertical rod of magnetic material and the coils are discrete, closely-spaced coils mounted on said rod to be supported thereby.

* * * * *